United States Patent [19]
Grüner

[11] Patent Number: 5,896,835
[45] Date of Patent: Apr. 27, 1999

[54] HEAT TRANSFER ARRANGEMENT AND METHOD OF MAKING SAME

[75] Inventor: Andreas Grüner, Göppingen, Germany

[73] Assignee: Behr GmbH & Co., Stuttgart, Germany

[21] Appl. No.: 08/996,206

[22] Filed: Dec. 22, 1997

[30] Foreign Application Priority Data

Dec. 24, 1996 [DE] Germany ............ 196 54 362

[51] Int. Cl.[6] ................................ F01P 11/08
[52] U.S. Cl. ...................... 123/41.33; 123/196 AB; 165/140; 165/916
[58] Field of Search ............ 123/41.33, 196 AB; 165/41, 140, 167, 916

[56] References Cited

U.S. PATENT DOCUMENTS

| | | | |
|---|---|---|---|
| 4,423,708 | 1/1984 | Sweetland | 123/196 AB |
| 5,409,058 | 4/1995 | Yuasa et al. | 165/140 |

FOREIGN PATENT DOCUMENTS

| | | |
|---|---|---|
| PS685914 | 1/1940 | Germany . |
| 2232990 | 1/1973 | Germany . |
| 3248395A1 | 7/1983 | Germany . |
| 4125079A1 | 2/1992 | Germany . |
| 4403144A1 | 8/1995 | Germany . |
| 19519740A1 | 12/1996 | Germany . |
| WO96/38699 | 12/1996 | WIPO . |

OTHER PUBLICATIONS

Patent Abstracts of Japan, 07224660A, ublished Aug. 22, 1995, Oil Air-Cooling System of Air-Cooled Engine.

*Primary Examiner*—Noah P. Kamen
*Attorney, Agent, or Firm*—Evenson, McKeown, Edwards & Lenahan, PLLC

[57] ABSTRACT

In heat transfer devices, which are constructed as plate oil coolers for motor vehicles, an adapter plate is provided in order to achieve a compact construction with a joint fastening and with feeding openings which are accessible only from one side. The adapter plate is configured such that at least two, but preferably four different plate coolers can be supplied with the same coolant flow. This results in a particularly simple and compact construction.

17 Claims, 3 Drawing Sheets

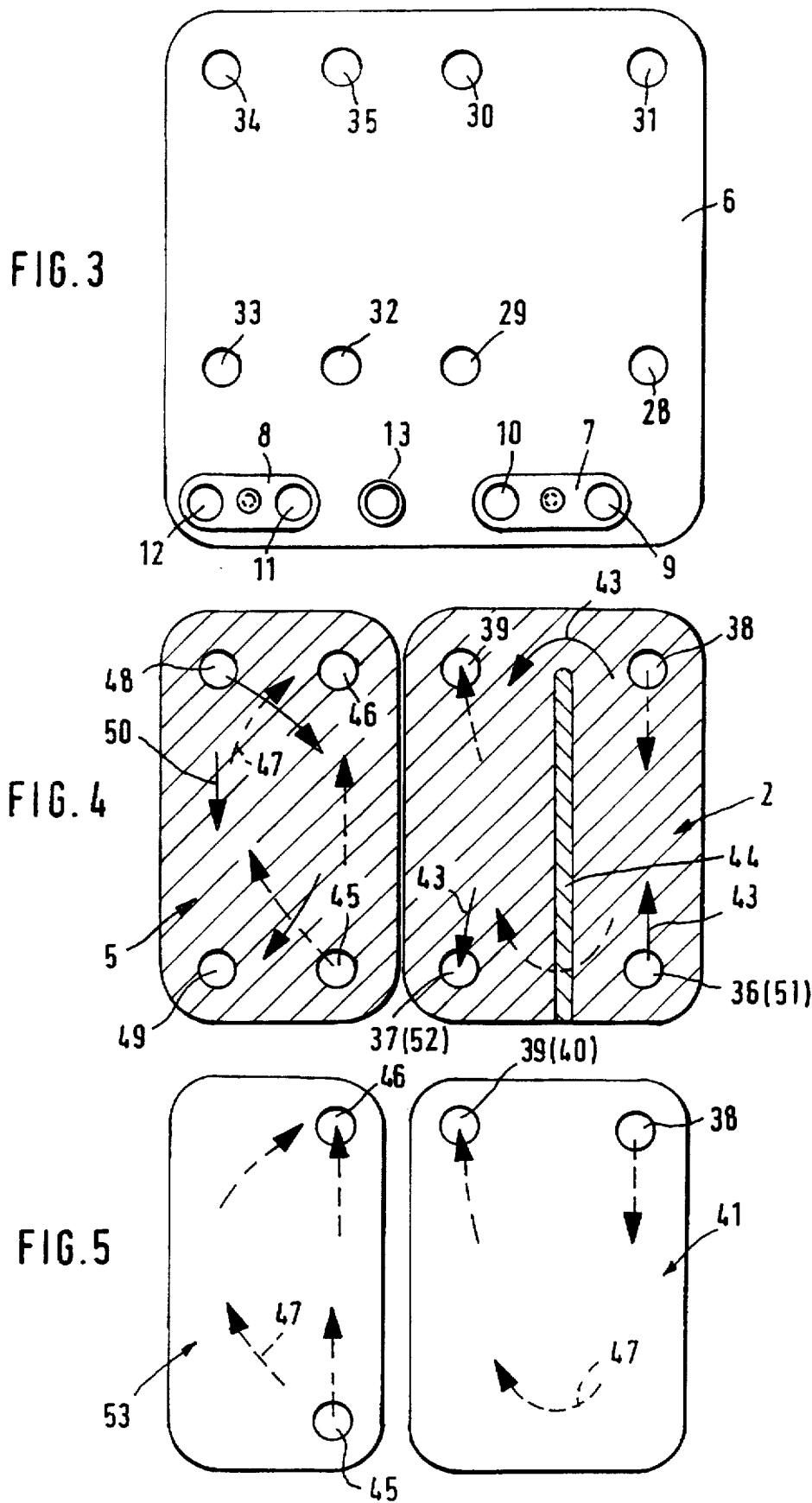

HEAT TRANSFER ARRANGEMENT AND METHOD OF MAKING SAME

BACKGROUND AND SUMMARY OF THE INVENTION

This application claims the priority of German application 196 54 362.2 filed in Germany Dec. 24, 1996, the disclosure of which is expressly incorporated by reference herein.

This invention relates to a heat transfer arrangement such as an oil cooler arrangement for motor vehicles having at least one heat transfer device. A liquid coolant and a liquid medium to be cooled are guided in the at least one heat transfer device in adjacent layers which are separated from one another by heat transmitting walls. An adapter plate is assigned to the heat transfer device, and connection ducts are provided between feeding and discharge bores for the heat transfer device.

Such a heat transfer device is known from German Patent Document DE-GBM 93 09 741. In this device, an adapter plate is assigned to the underside of a cooler constructed of plate-shaped heat exchange elements, as it is used in practice for cooling oil. This adapter plate is connected with a fastening plate which, on one side, closes off the adapter plate. The adapter plate is provided with recesses for forming a duct and with a feeding opening for the coolant. As a result, the heat transfer device can be fastened as a unit. As a result, inflow and discharge can simultaneously take place by way of the fastening plate from below.

There are a number of application possibilities in which several coolers must be provided for additional assemblies, such as an engine oil cooler, a servo oil cooler or a cooler for the transmission oil or for diesel oil. These additional assemblies must all be housed individually at a suitable point. This requires high expenditures and, moreover, sufficient space is not always available for housing the individual cooler aggregates.

The present invention is therefore based on the object of developing a heat transfer arrangement of the initially mentioned type such that several coolers can be combined to form a unit without any separate expenditures for the feeding of the coolant.

Based on the idea of using an adapter plate, the invention for achieving this object closes off the adapter plate by a cover plate. The cover plate is provided with a joint connection piece for the coolant, a connection duct and an opening for transporting the coolant. Two additional connections are provided for feeding and discharge of one medium respectively to be cooled of two heat transfer devices. These two heat transfer devices are arranged side-by-side on the cover plate and are connected to the joint connection piece for the coolant.

Because of this development, two or more heat transfer devices can be connected by way of a joint coolant connection and can jointly be fastened by the adapter plate. As a further development of the invention, coolant can flow in parallel through both heat transfer devices, and connection ducts for the coolant can rest on a joint end connection piece assigned to one of the two heat transfer devices.

According to certain preferred embodiments, it was found to be expedient to design one of two heat transfer devices for cooling the engine oil and the other for cooling the oil for the power steering. The reason for this is that these two coolers virtually represent the basic equipment for vehicles of different types and powers.

As a further development of the invention, heat transfer devices for cooling additional media, and particularly for cooling transmission oil and diesel oil, can be placed on the block of the engine cooler and/or of the servo oil cooler. Connections for the coolant are aligned with those of the blocks of the other two coolers and with those of the cover plate. In this manner, a compact assembly of different coolers which all have a common coolant connection and discharge can be achieved. The discharge connection piece for the coolant can be assigned to the engine oil cooler or to the diesel oil cooler placed upon the engine oil cooler. The invention achieves a heat transfer arrangement which can be individually adapted to the requirements of different vehicle types. However, since the arrangement has only an adapter plate as the fastening element and has an extremely compact construction, it can be installed in a simple and space-saving manner. In this case, the already existing coolant connection and discharge can be used for each of the coolers.

Other objects, advantages and novel features of the present invention will become apparent from the following detailed description of the invention when considered in conjunction with the accompanying drawings.

DETAILED DESCRIPTION OF THE DRAWINGS

Figure 1:
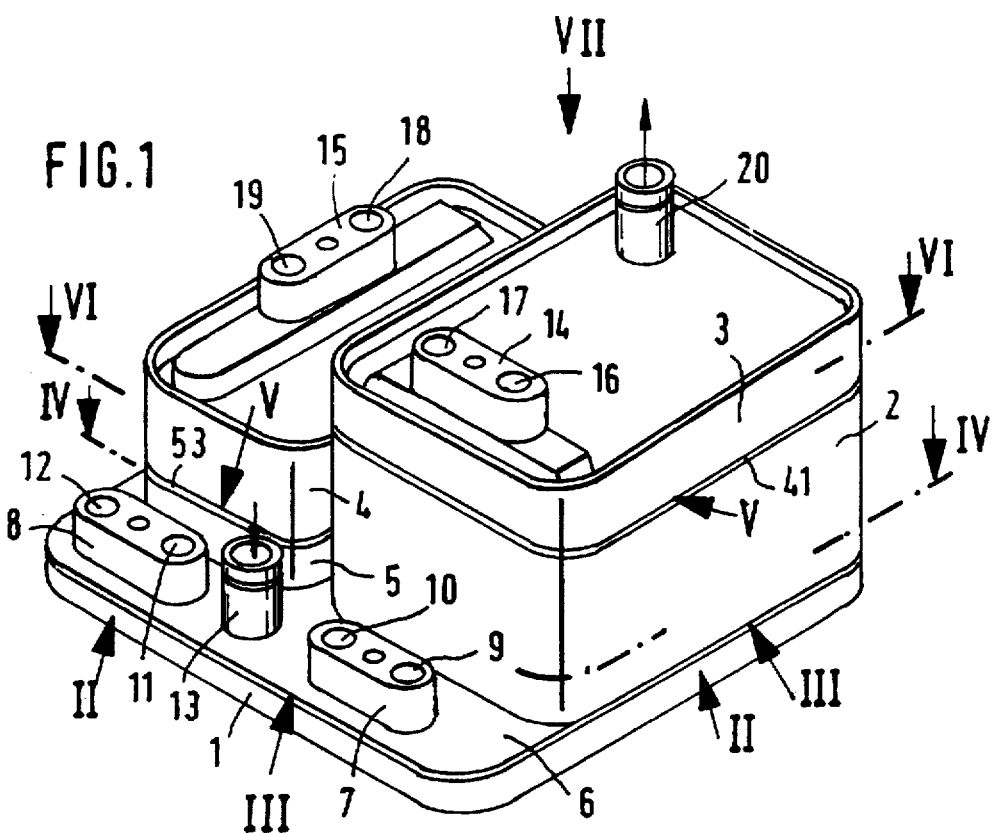
FIG. 1 is a perspective representation of a heat transfer arrangement constructed according to a preferred embodiment of the invention.

FIG. 1 illustrates a heat exchanger arrangement according to the invention which comprises an adapter plate 1 and heat transfer devices 2, 3, 4 and 5 fixedly connected with it. The adapter plate 1 is covered by a cover plate on which the two heat transfer devices 2 and 5 are mounted. In this case, the adapter plate 1 and the cover plate 6 are slightly larger than the base surface of the heat transfer devices 2 and 5. Two connection pieces 7 and 8 with connections 9, 10 and 11, 12 respectively are provided on the area of the cover plate 6 which in FIG. 1 is toward the left front. A connection piece 13 is also provided between these two connection pieces 7 and 8 and is used as- a joint feeding connection piece for the coolant flowing through the heat transfer devices 2, 3, 4 and 5. The connections 9 and 10 of the connection piece 7 are used for admitting the medium to be cooled to the heat transfer device 2. In the embodiment shown, this medium is engine oil. The connection openings 11 and 12 are used for supplying the oil for power steering, and forms the so-called servo oil. Each of the two heat transfer devices 3 and 4 is placed on top and is again designed with a feeding connection piece. The feeding connection piece 14 with the feeding and discharge openings 16, 17 is for diesel oil (heat transfer device 3), and the feeding connection piece with the feeding and discharge openings 18, 19 is for transmission oil (heat transfer device 4). In the embodiment shown, a discharge connection piece 20 projects from the heat transfer device 3 through which the coolant which is fed through the connection piece 13 flows off again.

The heat transfer devices 2, 3, 4 and 5 are all designed as plate coolers in which the plates, which are stacked upon one another at a defined distance with respect to one another, form flow spaces between one another through which alternately the coolant and the medium to be cooled by the coolant flow. Flowing and feeding of the two media to the individual chambers take place in a known manner. On the outside, the chambers are closed off by bent and mutually overlapping edges of the stacked plates. All heat transfer devices are tightly soldered.

As illustrated in FIG. 1, the coolant introduced through the inflow connection piece 13 flows through all heat transfer devices 2 to 5, while the medium to be cooled is in each case separately but also from the same side fed to the individual heat transfer devices. The coolant also enters the connection piece 13 from this side. The discharge connection piece 20 also projects toward the same side so that all connections for the media flowing through the heat transfer devices take place from one side. The adapter plate is therefore closed off toward the other side and can be used as a joint fastening plate, as is also illustrated in FIG. 2.

Figure 2:
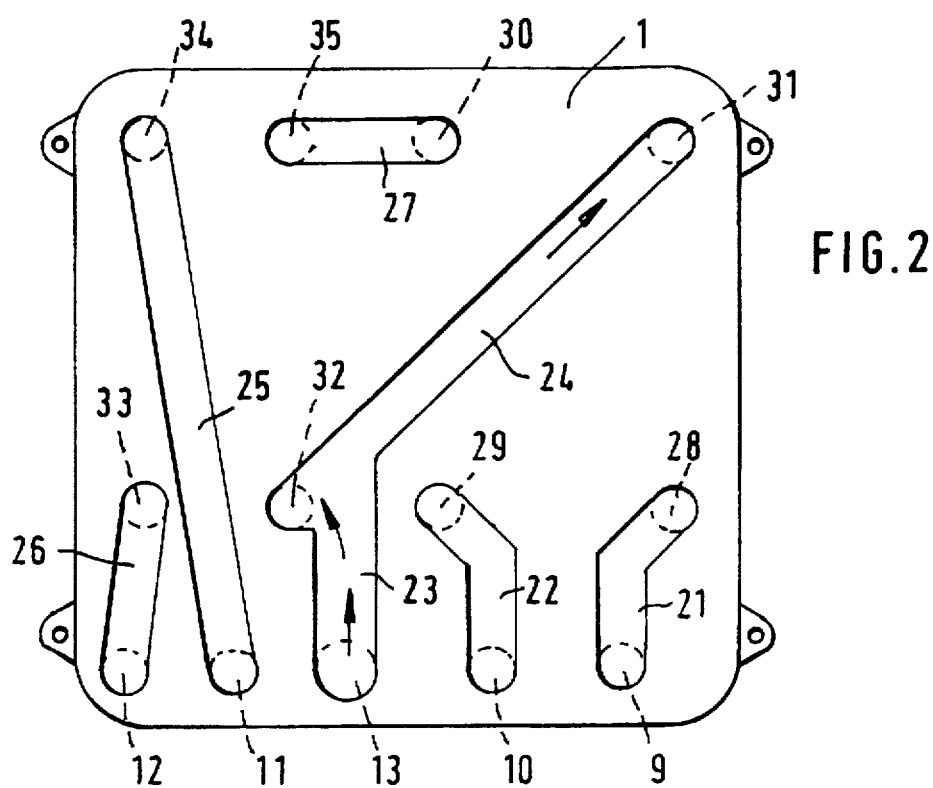
FIG. 2 is a top view of the adapter plate used for the arrangement of FIG. 1.

FIG. 2 shows that the adapter plate 1 is provided with several grooves in the form of connection ducts 21 to 27. The connection ducts are all milled into the adapter plate which consists, for example, of an aluminum alloy. It is also contemplated to provide a plastic plate instead of a diecast aluminum plate in accordance with other preferred embodiments of the invention.

Figure 3:
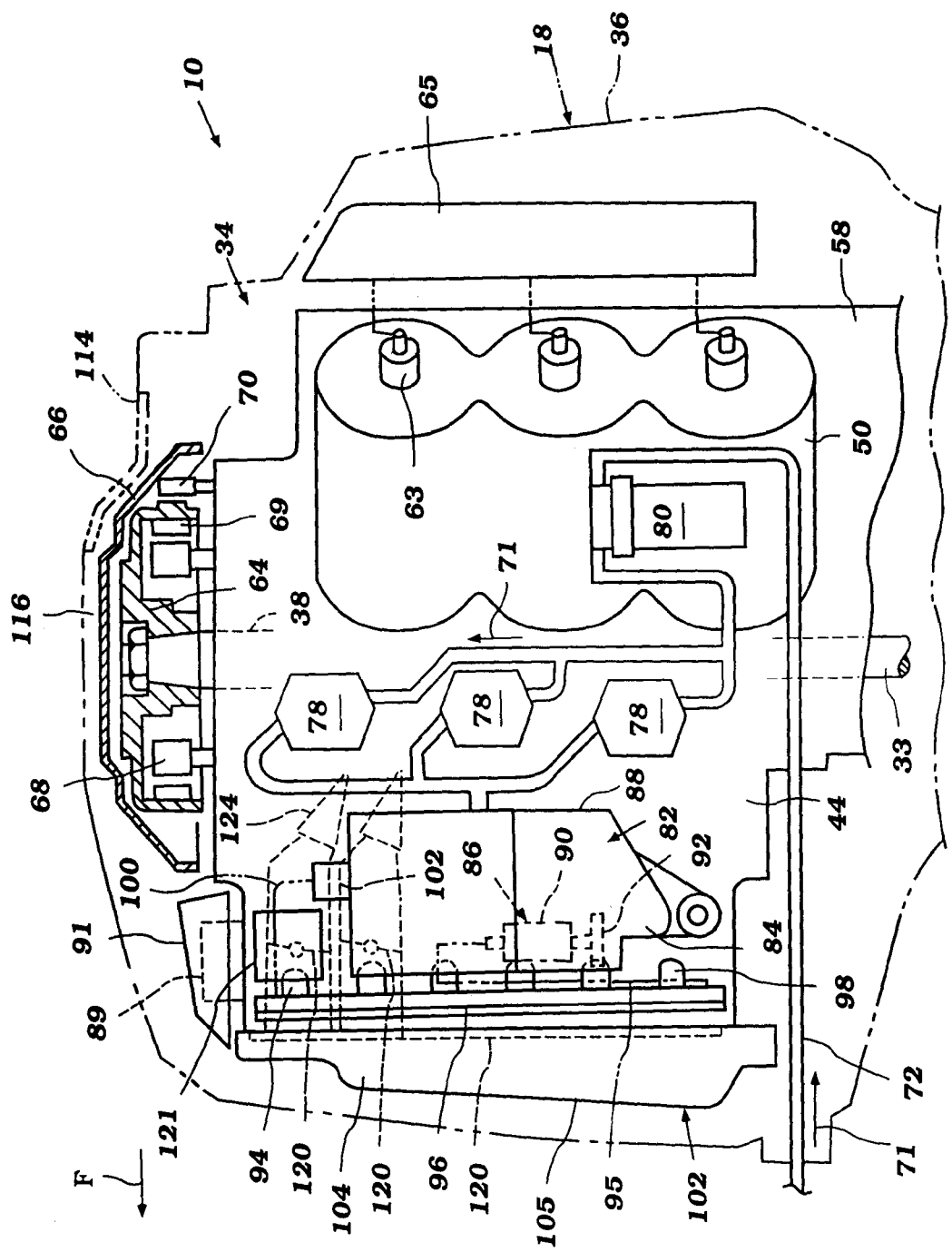
FIG. 3 is a top view of the cover plate disposed on the adapter plate of the arrangement of FIG. 1.

This adapter plate 1 is closed off by the cover plate 6 illustrated in FIG. 3 so that the ducts 21 to 27 are also closed. However, these ducts are connected through the cover plate 6 upwards with different connections which will be briefly discussed.

FIG. 3 shows that, in addition to the above-mentioned connection pieces 7, 8 and 13, the cover plate is also provided with openings 28 to 35 which are each aligned with the ends of the ducts 21 to 27 provided in the adapter plate 1. The positions of the openings 28 to 35 are indicated by broken lines in FIG. 2.

The coolant such as that which is used also for cooling the engine, therefore, flows through the connection piece 13 into the two ducts 23 and 24 of the adapter plate 1 and is distributed from there to the openings 31 and 32 in the cover plate 6. In the corresponding layer of the heat transfer device 2 placed on the cover plate 6, the coolant then flowsout of the opening 31 and out of the openings 38 aligned with the opening 31 in the direction of the arrows shown by broken lines in FIG. 4. The coolant flows in each chamber of the heat transfer device 2 in a U-shaped manner to the openings 39 aligned with the opening 30 in the cover plate 6. The coolant can travel from there further upwards to the passages 40 and 42 which are aligned with the openings 39. The intermediate plate 41 is disposed between the heat transfer devices 2 and 3, and the coolant travels from the passage 40 through the opening 42 to the outlet connection piece 20.

The engine oil or other medium to be cooled flows through the opening 9 into the connection piece 7, reaches the duct 21 and the opening 28 in the cover plate 6, and travels from there through the openings 36 in the heat transfer device 2 into the chambers which are adjacent to the layers through which the coolant flows. The coolant is guided in the direction of the arrows 43 through the chambers of the heat transfer device 2, which in a known manner are designed in a U-shape as a result of the partition, to the openings 37 aligned with the opening 29 in the cover plate 6. The medium to be cooled will reach the duct 22 leading to the outlet connection 10 by way of these openings 37. The coolant and the medium to be cooled are therefore guided in mutually offset layers in a manner known as counterflow with respect to one another. The feeding connection piece 13 and the discharge connection piece 20 for the coolant are utilized for the heat transfer device 2, for the heat transfer device 3 arranged thereon, for the heat transfer device 5 for the servo oil for the steering, and for the transmission oil heat transfer device 4 disposed on the heat transfer device 5.

The coolant is guided through the connection 13 and, by way of the duct 23, to the opening 32 in the cover plate 6. The coolant is moved from the opening 32 by way of the openings 45 (see FIG. 4) aligned with the opening 32 in the direction of the arrows 47 indicated by broken lines to the openings 46. The openings 46, in turn, are connected with the opening 35 in the cover plate 6 and, by way of the opening 35 and the duct 27, are connected with the opening 30 in the cover plate 6. The cover plate 6, in turn, is connected with the discharge connection piece 20 as explained above. The flow of the coolant and of the medium to be cooled in the individual layers takes place within the heat transfer device in the same manner as described by means of the heat transfer device 2. The medium to be cooled is supplied through the feeding connection piece 11 and travels within the adapter plate through the duct 25 to the opening 34 of the cover plate 6. The medium travels from the opening 34 to the openings 48 in the heat transfer device 5 and flows in the corresponding layers in the directions of the arrows 50 to the openings 49. The medium is guided from this location by way of the openings 33 in the cover plate 6 into the duct 26 and from there to the outlet connection piece 12. The flow of the coolant in the directions of arrows 47 or of the medium to be cooled in the directions of arrows 50 in each case takes place in adjacent layers of the plate coolers. Therefore, the openings 48 and 45 are in each case open only toward the corresponding chambers in which the flow is desired. Coolant flows through the two heat transfer devices 2 and 5 in the described manner but jointly and in parallel.

The coolant can also be utilized for flowing through two additional heat transfer devices 3 and 4 which are fixedly placed on top of the heat transfer devices 2 and 5.

To utilize the coolant in this way, in each intermediate plate 41 and 53, the connections for the coolant are aligned with those of the heat transfer device situated underneath and with the adapter plate 1. The opening 38 of the intermediate plate 41, therefore, is aligned with the opening having the same number in the heat transfer device 2 and, therefore, with the opening 31 in the cover plate 6. By way of these openings, which again lead into the individual chambers of the heat transfer device 3 disposed on the intermediate plate 41, the coolant can now circulate in the directions of the arrows 47 in the assigned chambers of the heat transfer device 3. This coolant is discharged again through the opening 39 toward the outlet connection piece 20.

The same approach takes place with respect to the heat transfer device 4 which is separated by an intermediate plate 53 (FIG. 5) from the heat transfer device 5 situated underneath the heat transfer device. In this case, the opening 45 in the intermediate plate 53 is aligned with the feeding openings 45 and with the opening 32 in the cover plate 6 so that the coolant flows in the direction of the arrows 47 out of the openings 45' through the assigned chambers of the heat transfer device 4. The medium to be cooled, which flows in through the opening 18 of the connection piece 15, is guided by way of the openings 481 in the directions of the arrows 50 in the adjacent chambers to the openings 49. The openings 49, in turn, are connected with the discharge opening 19.

It is also contemplated in other embodiments to place the two heat transfer devices 3 and 4 on the other side of the adapter plate 1 and to let the feeding of the coolant in each case take place at points 31 and 32 in the downward direction if the adapter plate 1 is provided with continuous recesses rather than grooves. However, it would be necessary in this case to carry out the feeding and removal of diesel oil or transmission oil to the connection pieces 14 and 15 from the other side. This is not always simple.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Heat transfer arrangement for motor vehicles, comprising:
   first and second heat transfer devices in which a liquid coolant and a liquid medium to be cooled are guided in adjacent layers which are separated from one another by heat transmitting walls,
   an adapter plate disposed to support the heat transfer devices, said adapter plate defining connection ducts between respective feeding and discharge bores of the first and second heat transfer devices, and
   a cover plate interposed between the first and second heat transfer devices and the adapter plate,
   wherein said cover plate includes:
      a joint connection piece for conducting coolant through the cover plate into a connection duct of the adapter plate,
      openings for transporting coolant from the adapter plate to the first and second heat transfer devices, and
      two additional connections for feeding and removing medium to be cooled in the first and second heat transfer devices supported side by side on the cover plate.

2. Heat transfer arrangement according to claim 1, wherein the adapter plate has a closed bottom and has one side covered by the cover plate.

3. Heat transfer arrangement according to claim 2, and further comprising a joint discharge connection piece for one of said first and second heat transfer devices to which discharge ducts for the coolant are connected by one of said connection ducts.

4. Heat transfer device according to claim 2, wherein the first heat transfer device is designed for the cooling of engine oil and the second heat transfer device is designed for the cooling of oil for power steering.

5. Heat transfer device according to claim 8, and further comprising further heat exchangers for cooling of transmission oil and diesel oil placed on respective blocks of the first heat transfer device and of the second heat transfer device and connections to said further heat exchangers for the coolant.

6. Heat transfer device according to claim 5, and further comprising a discharge connection piece for the coolant on one of the first heat transfer device and the further heat exchanger for cooling of diesel oil which is disposed on the first heat transfer device.

7. Heat transfer arrangement according to claim 1, and further comprising a joint discharge connection piece for one of said first and second heat transfer devices to which discharge ducts for the coolant are connected by one of said connection ducts.

8. Heat transfer device according to claim 7, wherein the first heat transfer device is designed for the cooling of engine oil and the second heat transfer device is designed for the cooling of oil for power steering.

9. Heat transfer device according to claim 8, and further comprising further heat exchangers for cooling of transmission oil and diesel oil placed on respective blocks of the first heat transfer device and of the second heat transfer device and connections to said further heat exchangers for the coolant.

10. Heat transfer device according to claim 9, and further comprising a discharge connection piece for the coolant on one of the first heat transfer device and the further heat exchanger for cooling of diesel oil which is disposed on the first heat transfer device.

11. Heat transfer arrangement according to claim 1, wherein the first heat transfer device is designed for the cooling of engine oil and the second heat transfer device is designed for the cooling of oil for power steering.

12. Heat transfer arrangement according to claim 11, and further comprising further heat exchangers for cooling of transmission oil and diesel oil placed on respective blocks of the first heat transfer device and of the second heat transfer device and connections to said further heat exchangers for the coolant.

13. Heat transfer arrangement according to claim 12, and further comprising a discharge connection piece for the coolant on one of the first heat transfer device and the further heat exchanger for cooling of diesel oil which is disposed on the first heat transfer device.

14. A method of making a heat transfer arrangement for motor vehicles, comprising:
   providing first and second heat transfer devices in which a liquid coolant and a liquid medium to be cooled are guided in adjacent layers which are separated from one another by heat transmitting walls,
   disposing an adapter plate to support the heat transfer devices, said adapter plate defining connection ducts between respective feeding and discharge bores of the first and second heat transfer devices,
   disposing a cover plate between the first and second heat transfer devices and the adapter plate,
   wherein said cover plate includes:
      a joint connection piece for conducting coolant through the cover plate into a connection duct of the adapter plate,
      openings for transporting coolant from the adapter plate to the first and second heat transfer devices, and
      two additional connections for feeding and removing medium to be cooled in the first and second heat transfer devices supported side by side on the cover plate,
   and fixedly attaching said heat transfer devices, cover plate and adapter plate together to form a multiple heat transfer device unit.

15. A method according to claim 14, wherein the adapter plate has a closed bottom and has one side covered by the cover plate.

16. A method according to according to claim 14, wherein the first heat transfer device is designed for the cooling of engine oil and the second heat transfer device is designed for the cooling of oil for power steering.

17. A method according to claim 16, and further comprising the steps of placing further heat exchangers for cooling of transmission oil and diesel oil on respective blocks of the first heat transfer device and of the second heat transfer device and providing connections to said further heat exchangers for the coolant.

* * * * *

UNITED STATES PATENT AND TRADEMARK OFFICE
CERTIFICATE OF CORRECTION

PATENT NO. : 5,896,835
DATED : April 27, 1999
INVENTOR(S) : Masahiko Kato

It is certified that error appears in the above-identified patent and that said Letters Patent is hereby corrected as shown below:

Title page,
Title page should be deleted, and substitute therefor the attached title page.

Drawings,
Drawing Sheets 1 - 3, should be deleted, and substitute therefor Drawing Sheets 1 - 10, as shown on the attached pages.

Columns 1 - 8, should be deleted, and substitute therefor columns 1 - 10, as shown on the attached pages.

Signed and Sealed this

Nineteenth Day of November, 2002

Attest:

JAMES E. ROGAN
Attesting Officer
Director of the United States Patent and Trademark Office

United States Patent [19]
Kato

[11] Patent Number: 5,896,835
[45] Date of Patent: Apr. 27, 1999

[54] INDUCTION SYSTEM FOR OUTBOARD MOTOR

[75] Inventor: Masahiko Kato, Hamamatsu, Japan

[73] Assignee: Sanshin Kogyo Kabushiki Kaisha, Hamamatsu, Japan

[21] Appl. No.: 08/781,447

[22] Filed: Jan. 10, 1997

[30] Foreign Application Priority Data

Jan. 10, 1996 [JP] Japan ................................ 8-020367

[51] Int. Cl.$^6$ ..................................................... F02M 51/00
[52] U.S. Cl. ..................................... 123/73 A; 123/184.24
[58] Field of Search ........................... 123/73 A, 184.24, 123/184.72, 184.47, 184.34

[56] References Cited

U.S. PATENT DOCUMENTS

| | | | |
|---|---|---|---|
| 4,770,132 | 9/1988 | Sougawa | 123/73 A |
| 5,016,578 | 5/1991 | Suzuki et al. | |
| 5,092,287 | 3/1992 | Motoyama | 123/73 A |
| 5,136,990 | 8/1992 | Motoyama | 123/73 A |
| 5,279,267 | 1/1994 | Takahashi et al. | |
| 5,506,166 | 4/1996 | Katoh | |

*Primary Examiner*—Marguerite McMahon
*Attorney, Agent, or Firm*—Knobbe, Martens, Olson & Bear LLP

[57] ABSTRACT

An induction system arrangement for an engine powering an outboard motor is disclosed. The engine has a block defining at least one combustion chamber which a member movably mounted therein which is connected to a crankshaft for driving the crankshaft. A throttle body is connected to the block and has a throttle passage leading from an inlet to the block. An air plenum is positioned at the inlet of the throttle body. A fuel injector is mounted to exterior of the throttle body corresponding to each throttle passage. The air plenum has an air inlet through which air is supplied to the engine, the air inlet positioned on a side of the throttle body opposite the fuel injectors.

20 Claims, 10 Drawing Sheets

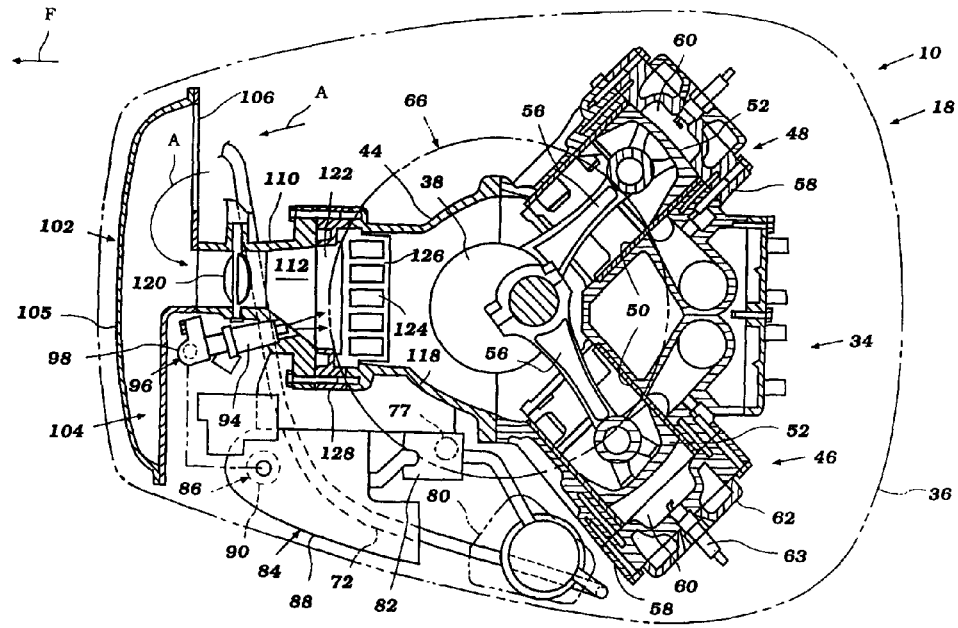

INDUCTION SYSTEM FOR OUTBOARD MOTOR

FIELD OF THE INVENTION

The present invention relates to an induction system for an outboard motor. More particularly, the invention is an improved air induction system for an outboard motor powered by an internal combustion engine having at least one fuel injector, where the fuel injector is protected from corrosion.

BACKGROUND OF THE INVENTION

Outboard motors which are utilized to power watercraft are often powered by an internal combustion engine positioned within a cowling of the motor. In many instances, the engine is of the type in which the fuel is injected either directly or indirectly into the combustion chamber(s) of the engine with one or more fuel injectors.

The air which is supplied for the combustion process is drawn from outside of the outboard motor cowling, through the interior of the cowling around the engine, and into the engine through an air inlet. Because the motor is operated in water, care must be taken to avoid drawing water into the cowling. For this reason, the air which is drawn into the engine is typically drawn from a vent positioned near the top of the outboard motor cowling.

Unfortunately, this air still contains a high level of moisture. For example, the air may be salt air containing salt water vapor. Some of the moisture in this air condenses on the engine as the air circulates about the engine from the cowling vent to the engine air inlet. This moisture corrodes the engine components. Corrosion of the fuel injectors of the engine is particularly detrimental. First, corrosion of the injectors may cause them to malfunction. Further, replacement of the injectors by the owner of the outboard motor is very costly and undesirable.

An induction system for an outboard motor powered by a fuel-injected internal combustion engine in which the engine components, especially the fuel injectors, are protected from the incoming air. It is also desired to provide a fuel injector mounting arrangement which protects the fuel injector from corrosion.

SUMMARY OF THE INVENTION

An internal combustion engine for use in powering an outboard motor and positioning within a cowling thereof is disclosed. The engine has a block defining at least one combustion chamber. A member is movably mounted in the chamber and connected to a crankshaft for driving the crankshaft. The crankshaft is journalled for rotation with respect to the cylinder block, and in the outboard motor setting, is generally vertical mounted for driving a water propulsion device of the outboard motor.

An induction passage is provided for routing an air and fuel mixture to each combustion chamber. Each induction passage has an air inlet positioned within an air plenum, and is preferably defined, at least in part by a passage through a throttle body having a first side and a second side. The air plenum has an inlet positioned therein along one side of the throttle body. A fuel injector is provided for injecting fuel into the air stream passing through the passage in each throttle body. The fuel injector is positioned outside of the air plenum on the second side of the throttle body opposite the air plenum inlet.

In the above-described arrangement, the induction system is arranged so that air passing through an air vent in the cowling passes along one side of the engine, opposite the fuel injector(s), to the air plenum inlet. In this manner, each fuel injector is protected from exposure to the incoming air.

In accordance with other aspects of the present invention, the body of the fuel injector may be sealed within a space within the throttle body, or coated with a corrosion protective coating. Alternative to the arrangement disclosed above, each fuel injector may be mounted in an enclosed space which is formed by a cover which defines the air plenum and an extension of the throttle body. Lastly, each fuel injector may be enclosed in a space defined by the throttle body and either a separate cover cooperating with the cover defining the inlet plenum, or a wall portion of the throttle body and a combined fuel pump regulator cover and air plenum cover.

Further objects, features, and advantages of the present invention over the prior art will become apparent from the detailed description of the drawings which follows, when considered with the attached figures.

BRIEF DESCRIPTION OF THE DRAWINGS

Figure 6:
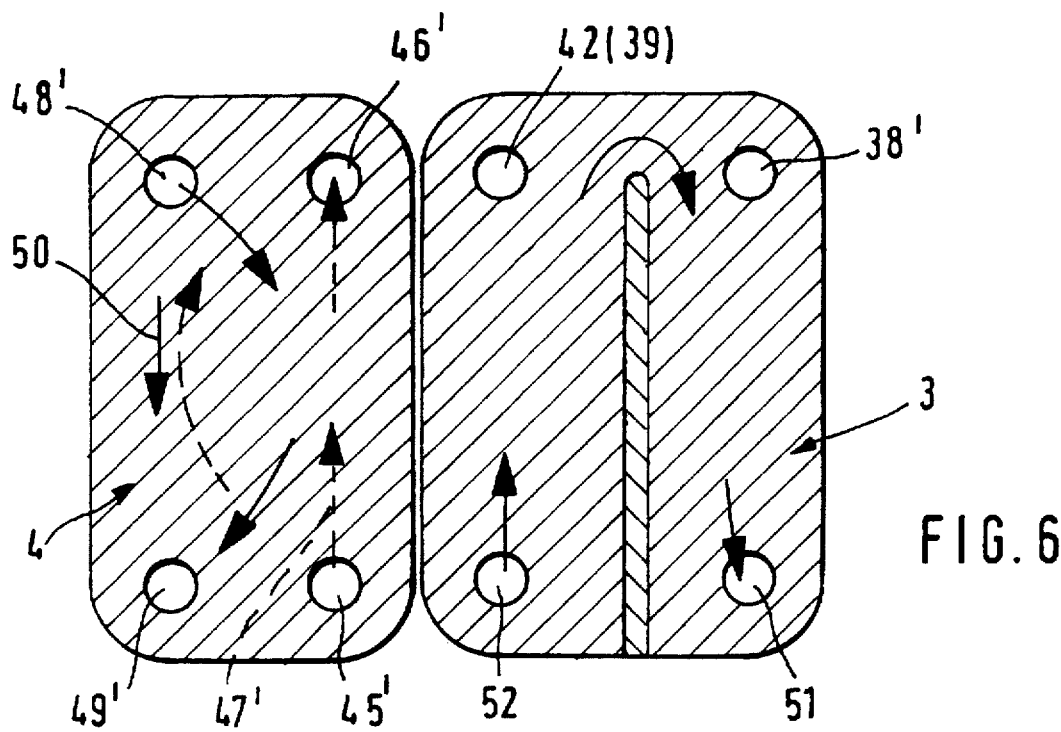
FIG. 6 is a schematic cross-sectional view of the two coolers for diesel oil and for transmission oil placed on top of the arrangement of FIG. 1.
Figure 7:
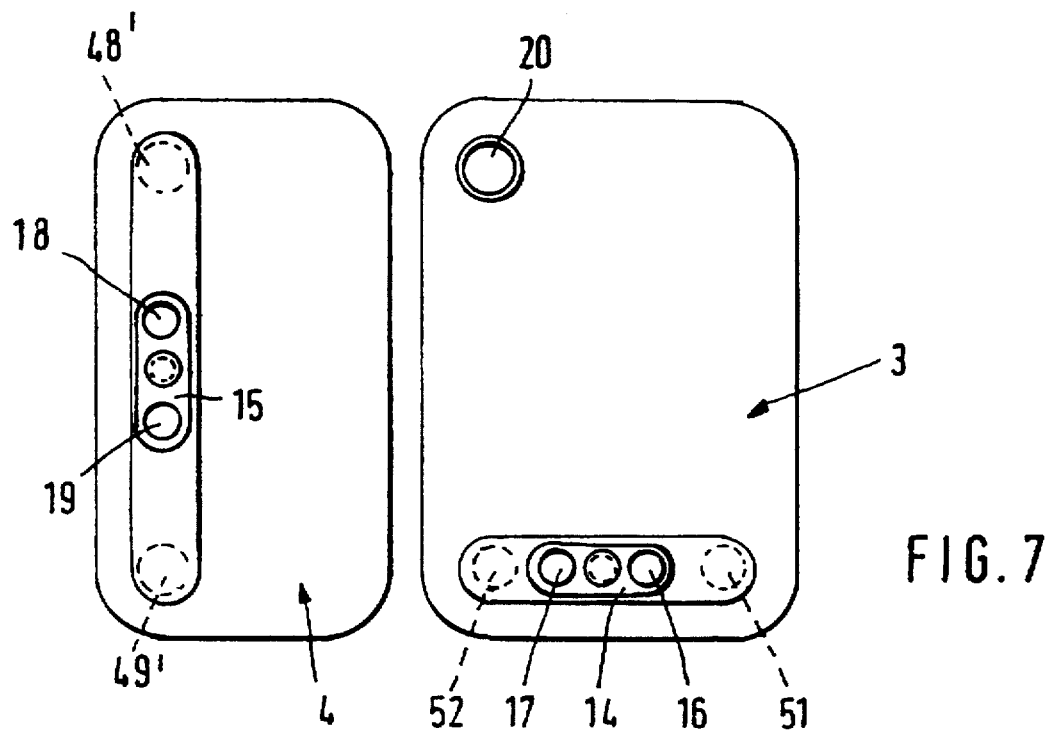
FIG. 7 is a top view of the two end plates for the coolers of the arrangement of FIG. 1.
Figure 1:
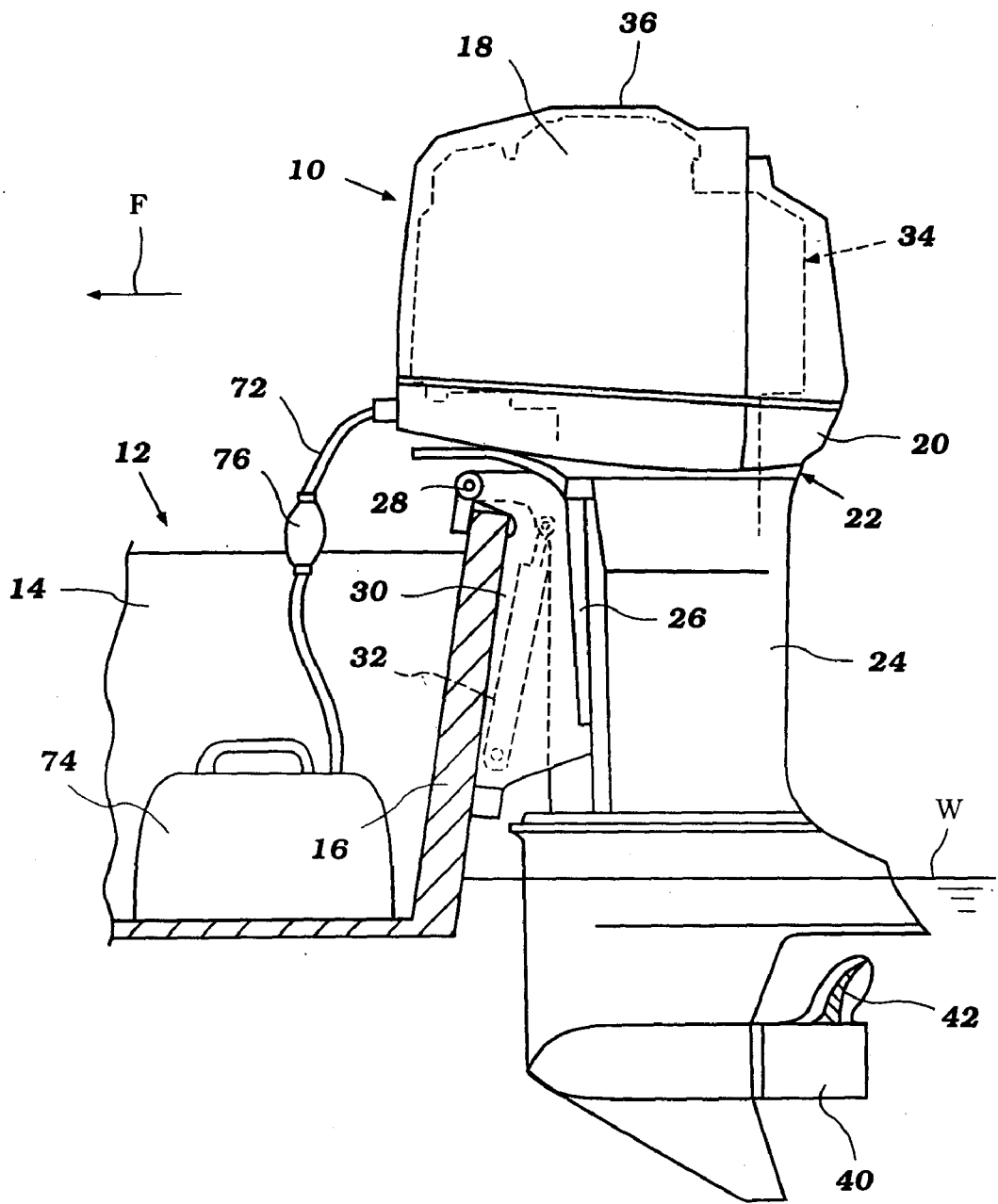
Figure 2:
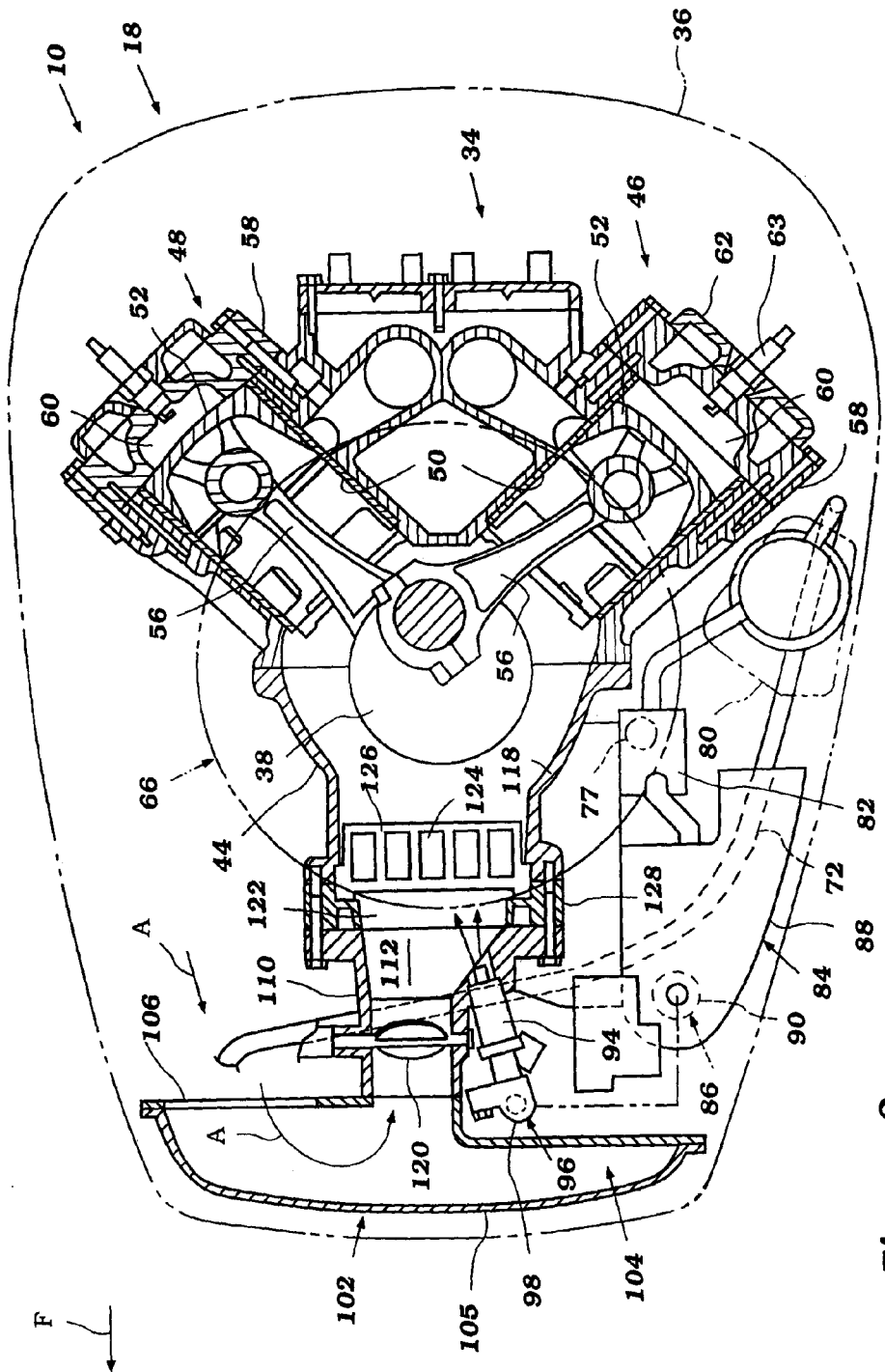
Figure 4:
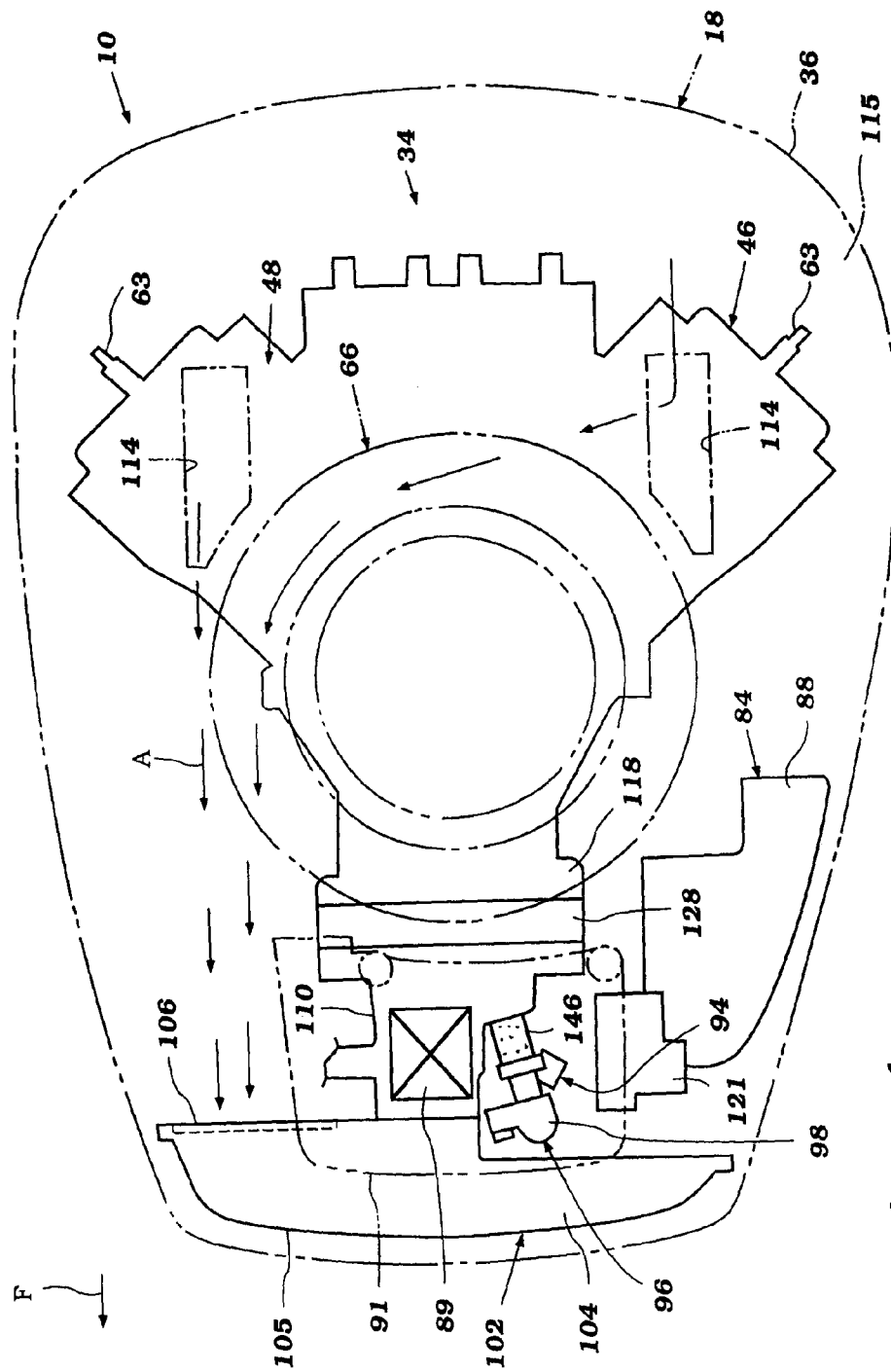
FIG. 4 is a cross-sectional view of the two plate oil coolers for the engine oil and for the power steering oil arranged on the cover plate of the arrangement of FIG. 1.
Figure 5:
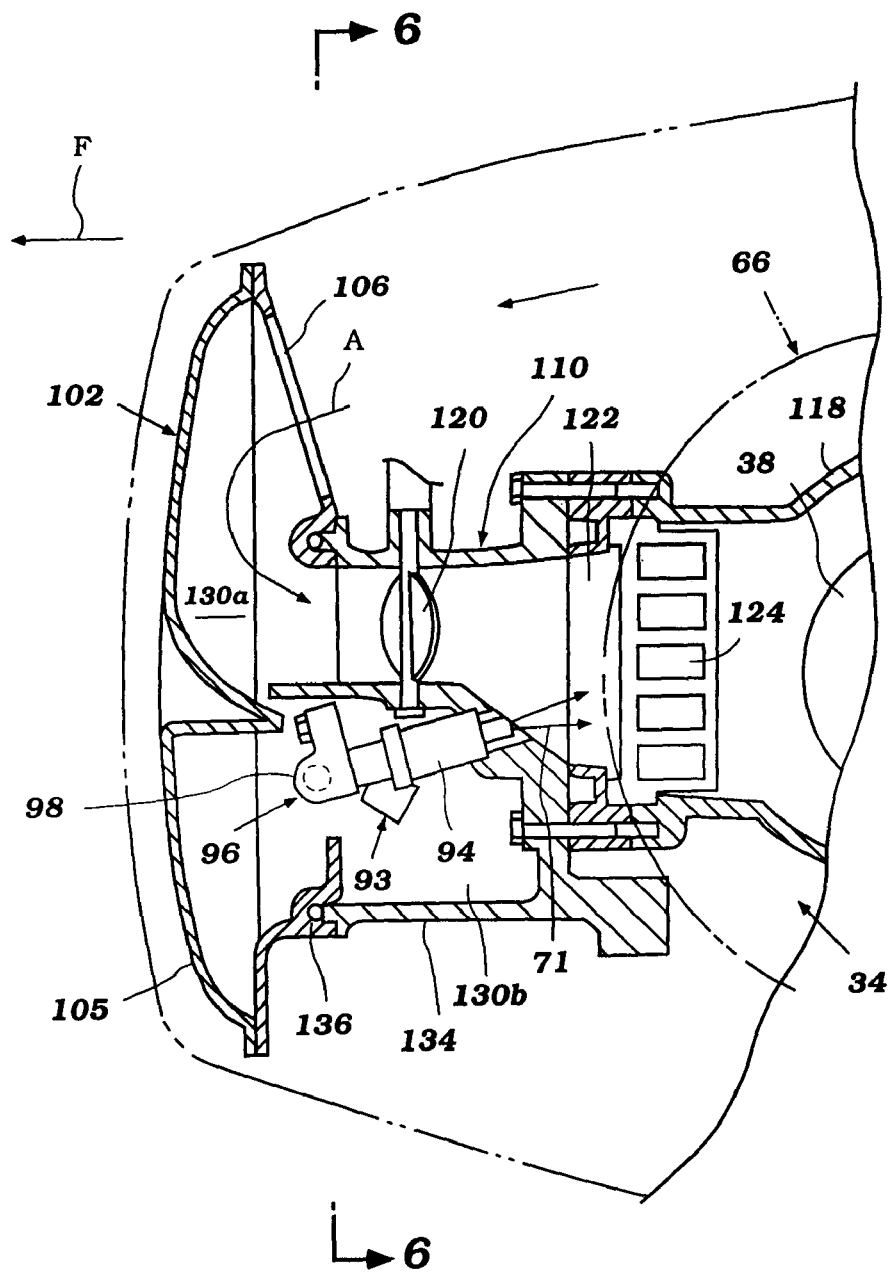
FIG. 5 is a view of the two intermediate plates closing off the two plate oil coolers of the arrangement of FIG. 1.
Figure 6:
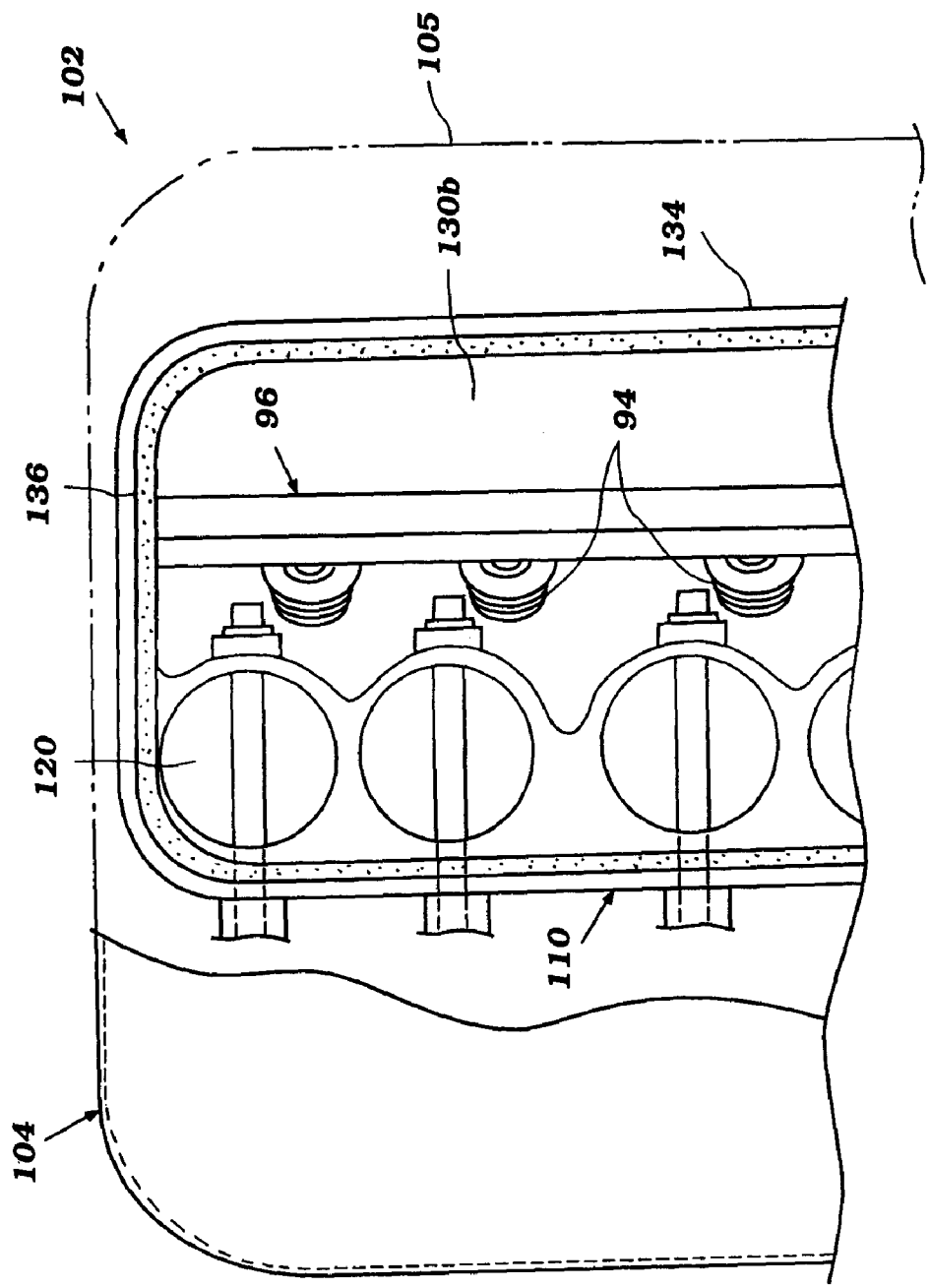
Figure 7:
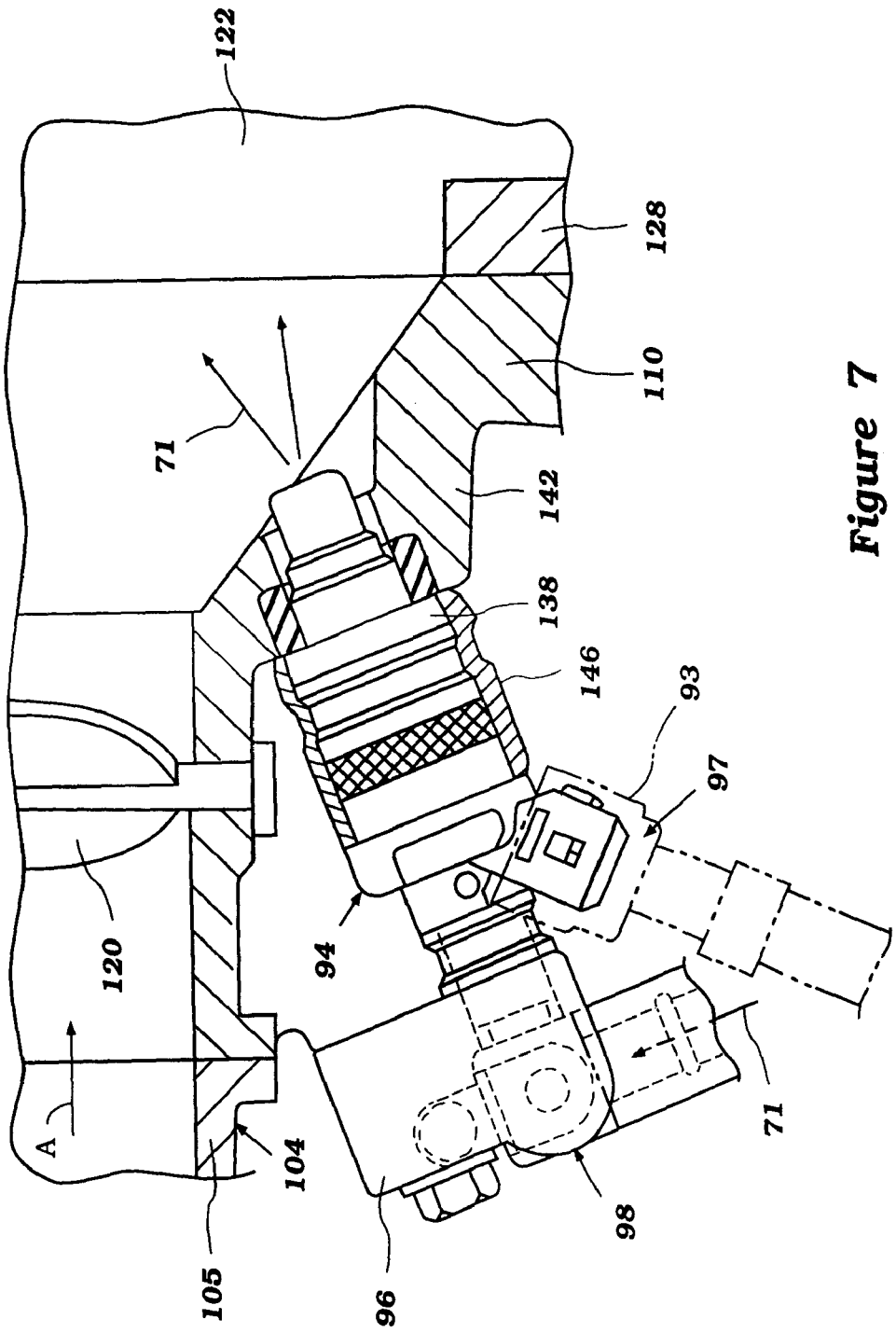
Figure 8:
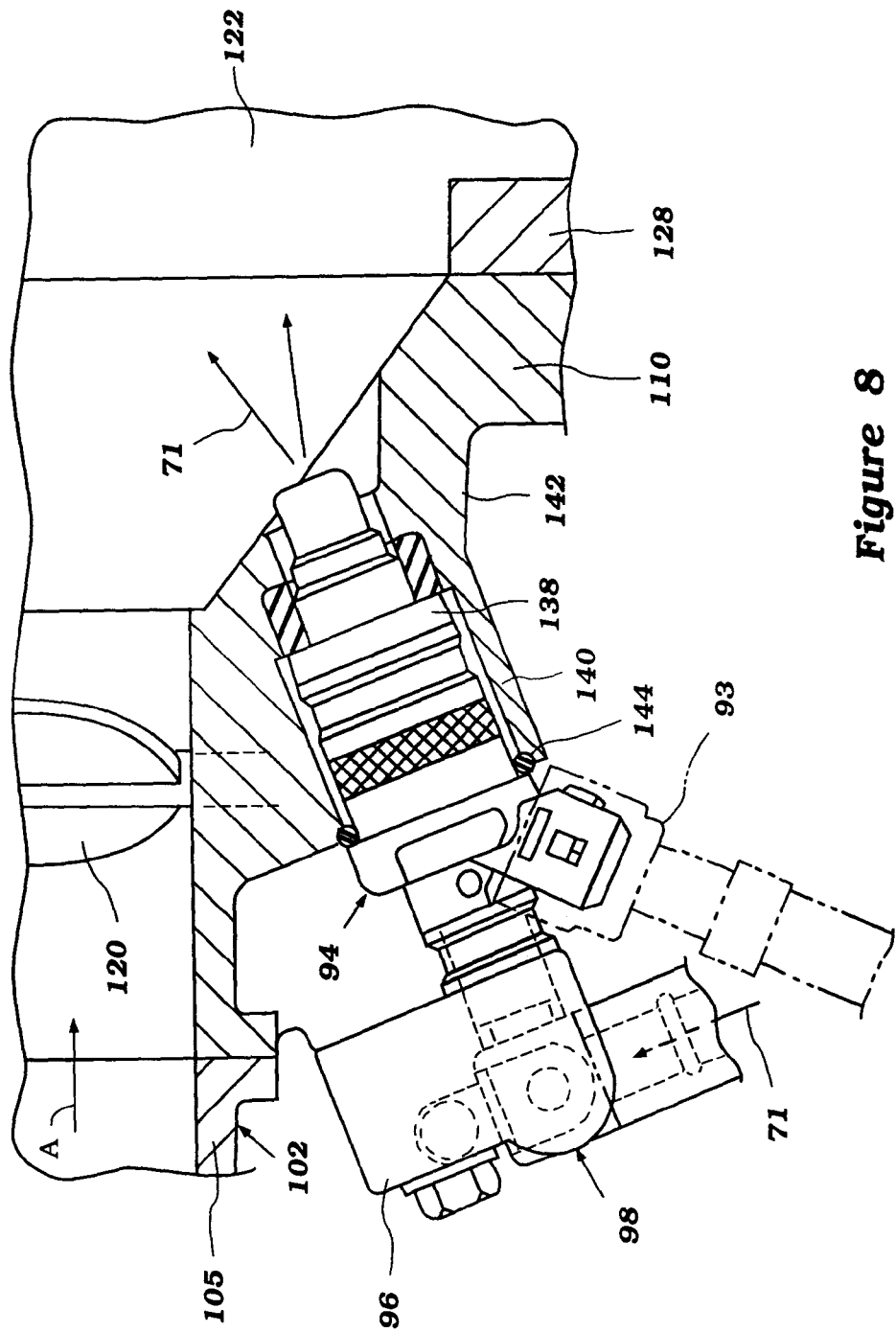
Figure 9:
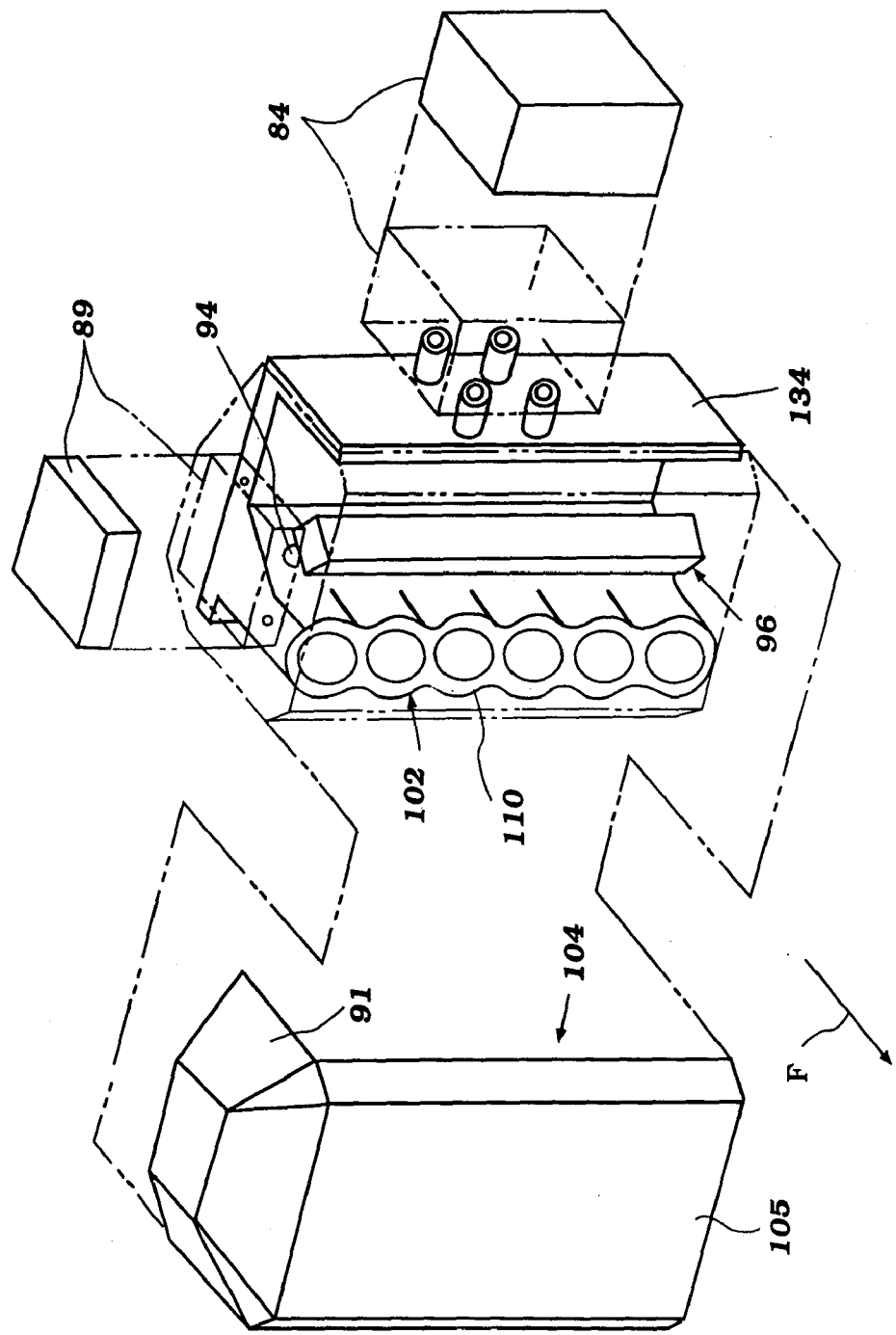
Figure 10:
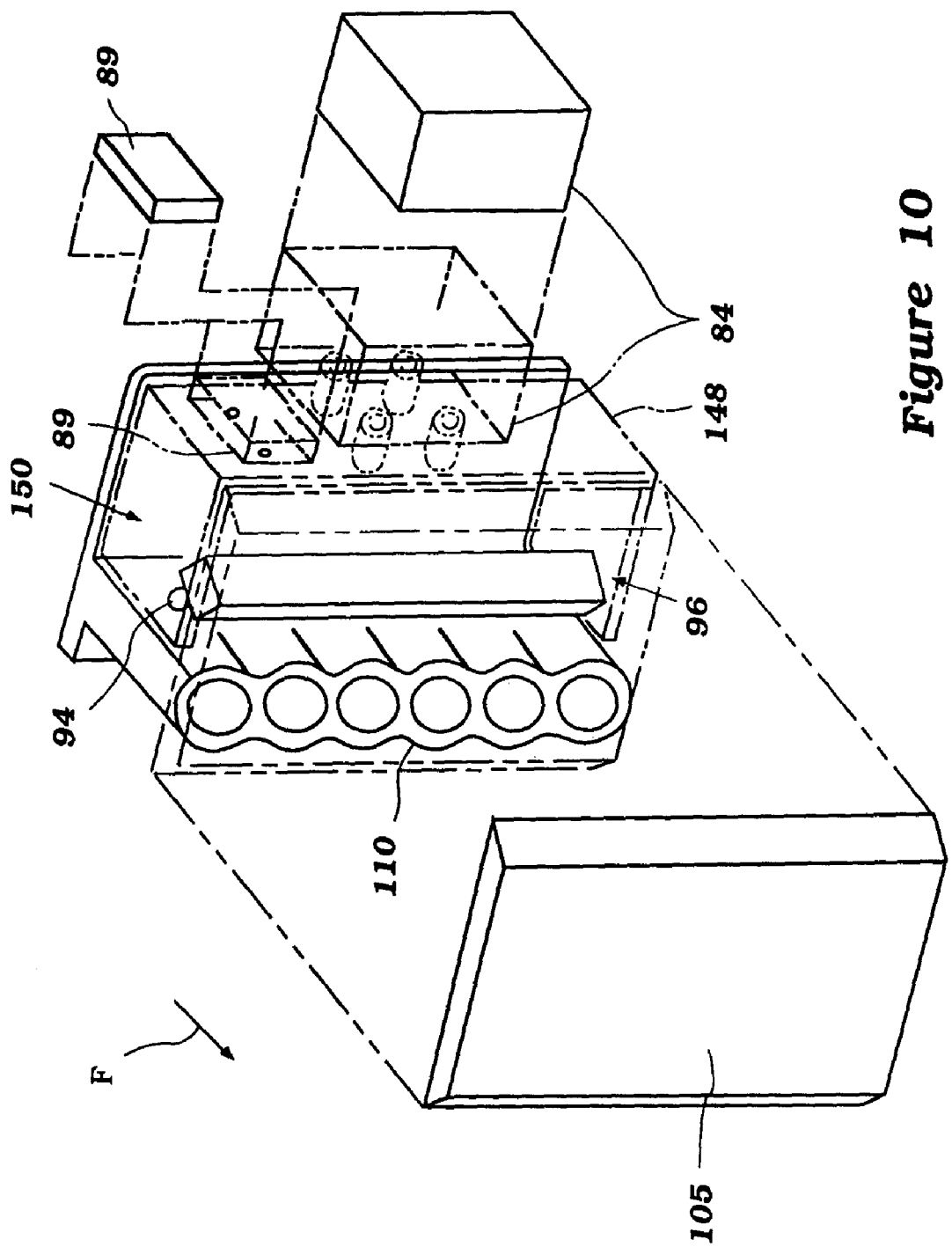

FIG. 1 is a side view of an outboard motor mounted on a watercraft and powered by an internal combustion engine and having an air induction system in accordance with the present invention;

FIG. 2 is a top view, in cross-section, of the engine of the outboard motor illustrated in FIG. 1;

FIG. 3 is a side view, shown in partial cross-section, of the engine illustrated in FIG. 2;

FIG. 4 is a top view of the engine of the outboard motor illustrated in FIG. 1, and illustrating the air flow path through the induction system;

FIG. 5 is a partial cross-sectional view of an alternate induction system arrangement to that illustrated in FIG. 2;

FIG. 6 is a cross-sectional view of the portion of the engine illustrated in FIG. 5 and taken along line 6—6 therein;

FIG. 7 is an enlarged, partial cross-sectional view illustrating a third embodiment of the present invention illustrating a specific fuel injector mounting;

FIG. 8 is an enlarged, partial cross-sectional view illustrating a fourth embodiment of the present invention in which a body of each fuel injector is coated with a corrosion protection coating;

FIG. 9 is a fifth embodiment of the present invention in which a cover forming an inlet plenum of the induction system and a cover of a fuel regulator are formed integrally and the fuel injectors are positioned within an enclosure formed with the cover and an extension of a throttle body; and FIG. 10 is a sixth embodiment of the present invention in which the fuel injectors are positioned in a space defined by a cover forming an air inlet plenum and a separate cover positioned adjacent a throttle body.

DETAILED DESCRIPTION OF THE PREFERRED EMBODIMENTS OF THE INVENTION

FIG. 1 illustrates an outboard motor 10 for use in propelling a watercraft 12. The watercraft 12 has a hull 14 defining a transom 16 at a stern portion thereof. The outboard motor 10 is positioned at a stern of the watercraft 20.

The outboard motor 10 preferably has a powerhead area 18 facing generally forward (in the direction F in FIG. 1 towards the watercraft 12). The powerhead 18 is positioned above a tray 20, which is in turn positioned above a lower unit 22. The motor 10 includes a steering shaft, not shown, affixed to the lower unit 22 by means of a lower bracket. The steering shaft is supported for steering movement about a vertically extending axis within a swivel bracket 26. The swivel bracket 26 is connected by means of a pivot pin 28 to a clamping bracket 30 which is attached to the watercraft transom 16. The pivot pin 28 permits the outboard motor 22 to be trimmed and tilted up about the horizontally disposed axis formed by the pivot pin 28. A power tilt and trim unit of any known type may be provided for moving the outboard motor 22 to move upwardly to its trimmed position. In addition, a shock absorber 32 or similar member is preferably provided for allowing the motor 10 to rise upwardly in the instance where it encounters an underwater obstacle, and which subsequently permits the motor 10 to lower back down to the position illustrated in relation to the water surface W.

The power head 18 of the outboard motor 10 includes an engine 34 which is positioned within a cowling 36. The engine 34 is preferably of the V-6, two-cycle crankcase combustion variety. The engine 34 is mounted in the power head 18 so that a crankshaft 38 (described in more detail below and illustrated in FIG. 3) thereof rotates about a vertically extending axis. This facilitates coupling to a drive shaft 33 (see also FIG. 3). The drive shaft depends into and is journalled within a drive shaft housing portion of the lower unit 22, wherein it drives a conventional bevel gear, forward neutral reverse transmission of a known variety. The transmission drives a propeller shaft (not shown) which is journalled within the lower unit 22 in a known manner. A hub 40 of a propeller, indicated generally by the reference numeral 42, is coupled to the propeller shaft for providing a propulsive force to the watercraft hull 14 in a manner well known in this art.

The construction of the engine 34 will now be described in more detail, referring first primarily to FIG. 2. As has been noted, the engine 34 is of the V-type and, accordingly, has a cylinder block 44 having a pair of cylinder banks 46,48 which extend at an angle relative to one another, giving the engine 34 its "V" configuration. Preferably, the engine 34 is oriented such that the cylinder banks 46,48 are positioned opposite the watercraft 12 (i.e., in the direction opposite "F" labeled in FIG. 2).

Each cylinder bank 46,48 includes a plurality of parallel cylinder bores 50 which are preferably formed by cylinder liners. Preferably, each cylinder bank 46,48 includes three bores 50 such that the engine is of the "V"-6 variety. While the engine 34 preferably includes six cylinders, it should be understood that the engine may include as few as one, or more than six cylinders. In addition, the engine may be other than of the "V" type, such as inline or flat.

A piston 52 is movably mounted within each cylinder bore 50. Each piston 52 is connected via a connecting rod 56 to the vertically extending crankshaft 38. Though not illustrated in detail, the crankshaft 38 is rotatably journalled with respect to the cylinder block 44 for rotation with respect thereto.

A cylinder head assembly 58 is connected to each cylinder bank 46,48 and extends over the cylinder bores 50. The cylinder head assemblies 58 cooperate with the cylinder block 44 and the bores 50 therein to define combustion chambers 60. A cover 62 is connected to each cylinder head assembly, and has a spark plug 63 extending therethrough into each combustion chamber 60 for igniting an air and fuel mixture therein, as is well known to those skilled in the art.

The spark plugs 63 may be fired by any suitable ignition system which may include a electronic control unit (ECU) 65.

As best illustrated in FIG. 3, a flywheel 64 is positioned on the end of the crankshaft 38 extending above the top end of the engine 34. The flywheel 64 is positioned beneath a cover 66. A charging coil 68 is positioned adjacent the flywheel 64 for cooperation with a number of magnets 69 thereon. The charging coil 68 is so positioned in relation to the magnets 69 that an electrical current is produced in the coil 68 for use in powering an ignition circuit (not shown) for firing the spark plugs 63. In addition, a pulsar coil 70 is positioned adjacent the flywheel 64 for use in determining the position of the crankshaft 38, and thus the proper firing time for each of the spark plugs 63. Preferably, the output of the pulsar coil 70 is routed to the ECU 65 for this purpose.

A fuel system is provided for introducing fuel into the combustion chambers 60. The fuel system includes a fuel line 72 extending from a fuel tank 74 positioned within the watercraft 12. A priming bulb 76 is preferably positioned along the line 72 for use in priming the fuel into the line from the tank. The fuel is drawn from the tank 74 by a plurality of low pressure pumps 78, which are preferably of the diaphragm-type and connected to the crankcase chambers for operation by the air pressure fluctuations therein. The fuel passes through a fuel filter 80 and along fuel lines 77 to the pumps 78, and from the pumps to a fuel bowl of a vapor separator assembly 82. The fuel filter 80 separates water and other contaminants from the fuel.

The vapor separator assembly 82 includes a vapor separator 84 as well as a high-pressure pump 86 which is positioned within the housing 88 of the vapor separator 84. The housing 88 defines an inner cavity which forms the fuel bowl of the vapor separator 84. A sloped bottom surface funnels the fuel towards an influent port of the pump 86 which is generally positioned at the bottom of the fuel bowl.

The high pressure pump 86 draws fuel into its influent port through a fuel strainer. The pump 86 includes an electric motor 90 which drives an impeller 92. The pump 86 delivers fuel to fuel injectors 94 (described in more detail below). The high pressure pump 86 draws fuel from the fuel bowl of the vapor separator 84 and pushes the fuel through a conduit which is connected to a fuel rail or manifold 96. The pump 108 delivers fuel under high pressure through the conduit 95 to the fuel rail 96. Preferably, a fuel pump regulator 89 electrically connects the high pressure pump 86 with the ECU 65 for control thereby. In the preferred arrangement, the regulator 89 is mounted beneath a cover 91 at the top of the throttle body 110 at the top end of the engine.

A check valve (not shown) is disposed within the conduit 95 to prevent a back-flow of fuel from the fuel rod 96. The fuel rail 96 has a supply port 98 corresponding to each fuel injector 94 for receiving an inlet end of each fuel injector and communicates therewith to supply the fuel injector 94 with fuel. The fuel rail 96 is elongate and vertically disposed. A fuel return line 100 extends between an outlet port of the fuel rail 96 and the fuel bowl of the vapor separator 84 through a pressure regulator 102. The return line completes the flow loop defined by the high pressure side of the fuel supply system to generally maintain a constant flow of fluid through the fuel rail 148. The pressure regulator 102 regulates pressure by dumping excess fuel back to the vapor separator 84, as known in the art.

As illustrated, each fuel injector 94 is connected to the fuel rail 96 from which fuel 71 is delivered thereto. The injector 94 preferably includes an electrical connection 93 by which the fuel injector 94 is operated, such as through an electrical signal from the ECU 65. Preferably, the electrical connection 93 comprises an electrical wire connected to a solenoid connector of the fuel injector via a grease-filled fitting 97 (See FIG. 7).

In accordance with the present invention, there is provided an air and fuel induction system. Preferably, the induction system 102 comprises an intake plenum 104 having an inlet 106 and an outlet 108 in communication with a throttle body 110 having a number of throttle passages 112 therethrough. Air ("A" labeled in FIG. 2) flows from outside the cowling 36 through an air inlet or vent 114 (see FIG. 1), through the interior 116 of the cowling to the inlet 106, and into the plenum 104 and out the outlet 108. A throttle passage 112 is provided through the throttle body 110 corresponding to each combustion chamber 60, there being six such passages in the instant case. Preferably, the plenum 104 is defined by a cover 105 engaging the throttle body 110.

Preferably, the engine 34 is of the crankcase compression-type, and as such, the throttle body 110 is mounted to a crankcase portion 118 of the cylinder block 44 in which the crankshaft 38 rotates. A throttle plate 120 is positioned in each throttle passage 112 for controlling the flow of air through the induction system 102. Each throttle plate 120 is movable with a throttle control wire or similar throttle plate operating mechanism known in the art. Preferably, a throttle passage opening sensor 121 is provided for monitoring the throttle plate 120 positions and providing feedback to the ECU 65.

Air flowing past the throttle plate 120 in the throttle passage 112 flows into an inlet passage 122 and therebeyond through a reed-type check valve 124 into the crankcase of the engine 34. There is provided a separate inlet passage 122 corresponding to each cylinder, and a corresponding valve 124 for controlling the flow of the air and fuel mixture in to the crankcase. In addition, the crankcase is divided into a number of chambers corresponding to each of the cylinders, as is well known to those skilled in the art.

Each reed-type valve 124 is mounted on a cage structure 126. As best illustrated in FIG. 2, each cage structure 126 is connected to a mounting plate 128 positioned between the throttle body 110 and the crankcase portion 118 of the cylinder block 44 and held therebetween with mounting bolts.

In accordance with a first aspect of the present invention, the induction system 102 is so designed that incoming air does not encounter the fuel injectors 94. In particular, the fuel injectors 94 are positioned on a side of the throttle body 110 opposite the induction system 102. Since the incoming air does not encounter the fuel injectors 94, the corrosive effects of the water vapor within the air on the injectors 94 is avoided.

As best illustrated in FIG. 2, in a first embodiment, the fuel injectors 94 are positioned between the crankcase portion 118 of the engine 34 and the air plenum 104, but on the opposite side of the plenum 104 from its inlet opening 106. The air flow path is best illustrated in FIGS. 2 and 4. As illustrated therein, the air passes through the cowling 36 through the vents 114 therein. The air then travels in the direction A about the top of the engine 34 and towards the side of the engine 34 opposite the fuel injectors 94 to the inlet 106 of the air plenum 104. From there, the air travels through the plenum 102 out its outlet 108, and into the passages 112 through the throttle body 110.

FIGS. 5 and 6 illustrate an alternate induction system 102 arrangement in accordance with a second embodiment of the present invention. As illustrated therein, the air inlet plenum cover 105 engages the throttle body 110 in a manner whereby first and second chambers 130a,b are created. Air is drawn through the inlet 106 to the first chamber 130a and from there it is discharged into the throttle passages 112 through the throttle body 110. The fuel injectors 94 are positioned within the second chamber 130b defined by the cover 105 and an outwardly extending wall portion 134 of the throttle body 110. As illustrated, the second chamber 130b is in communication with the first chamber at an upper portion thereof, but air does not flow therethrough because there is no air outlet. In this arrangement, a seal 105 is positioned between the cover 132 and the throttle body 110 for preventing air leaks therebetween.

FIG. 7 illustrates a third embodiment of the present invention in which the fuel injector is positioned partly within a protective chamber. As illustrated, the fuel injector 94 has a body portion having an outer surface 138 which is positioned within a recess defined by a wall portion 140 which extends from a base portion 142 of the throttle body 110. A seal 144 is arranged between the wall portion 140 and injector 94 for sealing the outer surface 138 thereof within the recess, thereby protecting the injector 94 from corrosion. Of course, this particular fuel injector 94 mounting arrangement may be utilized with either of the induction system arrangements disclosed above.

FIG. 8 illustrates a fourth embodiment of the present invention in which the fuel injector 94 is coated with a corrosion protectant. In this arrangement, the injector 94 is mounted to the base portion 142 of the throttle body 110. The outer surface 138 of the body of the injector 94 which is positioned outside of the throttle body 110 mounting recess is coated with a corrosion protection coating 146, such as aluminum, zinc, thermoplastic or a similar protective coating. This particular fuel injector arrangement may be used when the fuel injector is mounted in a variety of positions, including that illustrated in FIG. 4 and described in more detail above.

A fifth embodiment of the present invention is illustrated in FIG. 9. As illustrated therein, the cover 105 which cooperates with the throttle body 110 to form the air plenum 104 is formed integrally with the regulator cover 91 which covers the fuel pump regulator 89. In addition, the wall 134 which is integrally formed as part of the throttle body 110 serves as a mounting for the vapor separator 84, which is positioned on the exterior thereof. Here, as with the embodiment illustrated in FIG. 5, the fuel injectors 94 and fuel rail 96 are positioned within a space defined by the throttle body 110 and the cover 105, away from the incoming water-laden air.

Lastly, a fifth embodiment of the present invention is illustrated in FIG. 10. As illustrated therein, a separate cover 148 is attached to the throttle body 110 for forming an enclosed space within which the fuel injectors 94 and fuel rail 94 are positioned (as opposed to the arrangement illustrated in FIG. 9 in which the throttle body 110 includes an integrally formed wall 134). Here, cover 105 defining the plenum 104 cooperates with this cover 148. Preferably, the vapor separator 84 and fuel pump regulator 89 are mounted to the outside of the cover 148. In this arrangement, the fuel injectors 94 are also protected from corrosion because air enters the side of the plenum 104 opposite the fuel injectors 94 and then passes into the throttle body 110, with the air surrounding the injectors being stagnant.

It should be understood that while the invention described above has been described in conjunction with a two-cycle, crankcase combustion, reciprocating piston type engine, that the present invention may be adapted to other types of engines, including rotary, four-cycle, and two-cycle non-crankcase combustion type engines.

Of course, the foregoing description is that of preferred embodiments of the invention, and various changes and modifications may be made without departing from the spirit and scope of the invention, as defined by the appended claims.

What is claimed is:

1. An outboard motor having a cowling defining an interior space and an internal combustion engine mounted therein, said engine having an engine body comprised of an engine block with a head connected thereto and defining at least one combustion chamber therein, a member movably mounted in said combustion chamber and connected to a crankshaft, said crankshaft journalled for rotation with respect to said engine body and extending generally vertically, an induction passage defined at least in part by a throttle body formed at one end of said engine body and extending outwardly therefrom, said induction passage having an inlet and an outlet, said outlet in communication with said combustion chamber, an air plenum extending transversely across said inlet of said induction passage, said plenum having an air inlet disposed on one side of said induction passage and in facing relation to said engine body in a generally unobstructed area between said plenum and said engine body for relatively free air flow into said inlet and outlet, said outlet being in communication with said inlet of said induction passage, and a fuel injector for injecting fuel into air passing through said induction passage positioned on a side of said throttle body opposite said plenum inlet, said plenum having a protecting portion extending transversely outwardly beyond said outlet and in spaced relation to said engine body so that said fuel injector is nested between said engine body and said plenum protecting portion.

2. The outboard motor in accordance with claim 1, wherein the fuel injector has a first end connected to a fuel supply and a second end positioned in said passage and a body portion therebetween, and wherein at least a portion of said body is coated with a corrosion protective coating.

3. The outboard motor in accordance with claim 1, wherein the fuel injector has a first end connected to a fuel supply and a second end positioned in said passage and a body portion therebetween, and wherein said throttle body has a recessed section in which at least a portion of said body is positioned.

4. The outboard motor in accordance with claim 1, wherein said plenum is defined by at least in part by a cover connected to said throttle body.

5. The outboard motor in accordance with claim 4, wherein said throttle body cooperates with said cover to define a first chamber and a second chamber, with air passing through said first chamber from said plenum inlet to outlet and wherein said fuel injector is positioned within said second chamber.

6. The outboard motor in accordance with claim 1, wherein said engine includes a fuel system for providing fuel to said fuel injector, said fuel system including a vapor separator, said vapor separator mounted upon an outside wall of said throttle body that is spaced from said plenum inlet.

7. The outboard motor in accordance with claim 6, wherein said fuel system includes a fuel pump and a regulator for controlling said fuel pump, said regulator mounted upon an upper surface of said throttle body.

8. The outboard motor in accordance with claim 6, wherein said plenum is defined at least in part by a cover attached to said throttle body, said cover including a portion extending over said regulator.

9. The outboard motor in accordance with claim 1, wherein said fuel injector is positioned within a chamber defined by a wall extending outwardly from said throttle body and said plenum.

10. The outboard motor in accordance with claim 1, wherein said fuel injector is positioned within a chamber defined by said throttle body, an injector cover attached to said throttle body, and said plenum.

11. The outboard motor in accordance with claim 10, wherein said engine includes a fuel system for delivering fuel to said fuel injector, said system including a fuel regulator for controlling a fuel pump for delivering fuel to said injector and a vapor separator, said vapor separator and said fuel regulator being connected to an outside surface of said injector cover.

12. The outboard motor in accordance with claim 1, further including at least one vent in said cowling through which air passes, said engine having an induction system defining an air pathway from said vent along the top and a side of said engine adjacent to said plenum inlet.

13. An internal combustion engine for use in a marine environment, said engine having an engine body comprising an engine block defining at least one combustion chamber therein, a member movably mounted in said combustion chamber and connected to a crankshaft journalled for rotation with respect to said engine block, said engine having an induction system at one side of said engine body for providing an air and fuel mixture to said combustion chamber, said induction system comprising a throttle body having an inlet and a passage therethrough leading to said combustion chamber, an air plenum communicating with said throttle body inlet and extending transversely across said throttle body in spaced relation to said engine body, a fuel injector having a first end and a second end and an injector body portion therebetween, said first end positioned within said passage through said throttle body for delivering fuel to air passing through said passage, said air plenum having an air inlet formed on a portion thereof extending outwardly of said throttle body at one side thereof and facing said engine body in a generally unrestricted area, said air plenum having a further portion thereof extending outwardly of said throttle body at the other side thereof defining a restricted area on said other side of said throttle body around said injector with said throttle body and said engine body.

14. The engine in accordance with claim 13, wherein at least a portion of said body of said injector is coated with a corrosion protective coating.

15. The engine in accordance with claim 13, wherein said injector is electrically operated and has an electrical connection and wherein said engine includes an electrical wire leading from a control unit for connection to said injector electrical connection for operating the injector, said connection of said electrical wire to said injector electrical connection being grease filled.

16. The engine in accordance with claim 13, wherein said throttle body has a mounting portion with a recess therein, said body of said injector positioned at least partly within said recess.

17. The engine in accordance with claim 13, wherein said throttle body has a wall section extending therefrom and cooperating with a cover to define a chamber in which said injector is positioned.

18. The engine in accordance with claim 13, wherein there are multiple, vertically spaced, combustion chambers and said throttle body defines a plurality of vertically spaced throttle passages each extending from said air plenum to a respective one of said combustion chambers, and a plurality of fuel injectors each cooperating with a respective one of said throttle passages, and further including a fuel rail for providing fuel to said fuel injectors, said fuel rail and fuel injectors all being positioned within said restricted area.

19. The engine in accordance with claim 18, wherein said restricted area is also formed by a wall extension of said throttle body.

20. The engine in accordance with claim 13, wherein said engine comprises a two cycle crankcase, compression engine and said engine body further defines a crankcase chamber corresponding to said combustion chamber, and wherein said passage through said throttle body extends to an inlet of said crankcase chamber.

* * * * *